(12) United States Patent
Lee

(10) Patent No.: US 7,581,845 B2
(45) Date of Patent: Sep. 1, 2009

(54) BACKLIGHT ASSEMBLY AND LIQUID CRYSTAL DISPLAY APPARATUS HAVING THE SAME

(75) Inventor: Jae-Sang Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 90 days.

(21) Appl. No.: 11/197,570

(22) Filed: Aug. 3, 2005

(65) Prior Publication Data
US 2006/0044779 A1    Mar. 2, 2006

(30) Foreign Application Priority Data
Aug. 28, 2004  (KR)  ............... 10-2004-0068226

(51) Int. Cl.
*G09F 13/04* (2006.01)
(52) U.S. Cl. ............ 362/97.2; 362/224; 362/225
(58) Field of Classification Search ......... 362/600–634, 362/97.2, 224, 225
See application file for complete search history.

(56) References Cited
U.S. PATENT DOCUMENTS

| | | | |
|---|---|---|---|
| 6,811,276 B2 * | 11/2004 | Moon .................. | 362/600 |
| 6,825,896 B2 * | 11/2004 | Goto et al. ............. | 349/65 |
| 6,857,759 B2 * | 2/2005 | Lee et al. .............. | 362/225 |
| 7,014,343 B2 * | 3/2006 | Leu et al. .............. | 362/331 |
| 7,056,005 B2 * | 6/2006 | Lee ..................... | 362/625 |
| 7,131,742 B2 * | 11/2006 | Moon .................... | 362/97 |
| 2002/0001184 A1 * | 1/2002 | Kim et al. .............. | 362/27 |
| 2003/0035283 A1 * | 2/2003 | Lim .................... | 362/97 |
| 2003/0227767 A1 | 12/2003 | Lee et al. | |
| 2005/0047111 A1 * | 3/2005 | Wu ..................... | 362/31 |

FOREIGN PATENT DOCUMENTS

CN    1503038 A    6/2004

* cited by examiner

*Primary Examiner*—Stephen F Husar
*Assistant Examiner*—James W Cranson
(74) *Attorney, Agent, or Firm*—Haynes & Boone, LLP.

(57) ABSTRACT

In a backlight assembly and a liquid crystal display apparatus, the backlight assembly has lamps parallel to each other to emit a light, a receiving container having a bottom portion and a side portion to receive the lamps, and a mold member coupled to the receiving container to cover the ends of the lamps. The mold member has a reflecting face having a diffusion pattern that reflects the light from the lamps and an upper face extending from the reflecting face in a plane substantially parallel to the bottom portion. Thus, a shadow portion of the backlight assembly may be removed, to thereby enhance image display quality of the liquid crystal display apparatus.

28 Claims, 10 Drawing Sheets

600

BACKLIGHT ASSEMBLY AND LIQUID CRYSTAL DISPLAY APPARATUS HAVING THE SAME

CROSS-REFERENCE TO RELATED APPLICATION

This application relies for priority upon Korean Patent Application No. 2004-68226 filed on Aug. 28, 2004, the content of which is herein incorporated by reference in its entirety.

BACKGROUND OF THE INVENTION

1. Field of the Invention

The present invention relates to a backlight assembly and a liquid crystal display apparatus having the backlight assembly.

2. Description of the Related Art

In general, a liquid crystal display apparatus is a flat panel display device that uses liquid crystal in order to display an image. Such liquid crystal display apparatuses have various characteristics such as a thinness, light weight, low driving voltage, low power consumption, etc., and therefore have been widely used in various industries relating to display technology.

In the above liquid crystal display apparatus, the liquid crystal panel is not a self-emissive light element that generates light. Therefore, a backlight assembly is often used in order to supply light to the liquid crystal panel.

The backlight assembly includes a lamp for generating light. Often, the lamp employs a cold cathode fluorescent lamp (CCFL) having a thin and elongated tubular shape. The backlight assembly is classified generally into an edge illumination type and a direct illumination type, depending on the lamp position. In the edge illumination type backlight assembly, one or two lamps are positioned adjacent to a lateral side of a transparent light guide plate, and the light from the lamp is multiple-reflected from the light guide plate and then applied to the liquid crystal display panel. In the direct illumination type backlight assembly, a plurality of lamps are disposed under the liquid crystal display panel, a diffusing plate is disposed between the lamps and the liquid crystal display panel, and a reflecting plate is disposed under the lamps. The light from the lamps is reflected from the reflecting plate and diffused by the diffusing plate, and the diffused light is applied to the liquid crystal display panel. Thus, the edge illumination type backlight assembly is applied generally to a small-scale liquid crystal display apparatus, and the direct illumination type backlight assembly is applied to a large-scale liquid crystal display apparatus requiring a high brightness.

However, in case of the direct illumination type backlight assembly, the peripheral region of the backlight assembly appears relatively dark compared to the central region of the backlight assembly. Uniformity of light from the backlight assembly is deteriorated, thereby degrading image display quality thereof.

SUMMARY OF THE INVENTION

The present invention provides a backlight assembly capable of improving brightness uniformity.

The present invention also provides a liquid crystal display apparatus having the above backlight assembly.

In one aspect of the present invention, a backlight assembly includes lamps, a receiving container and a mold member. The lamps, which are substantially parallel to each other, generate light. The receiving container having a bottom portion and a side portion receives the lamps. The mold member is coupled to the receiving container to cover ends of the lamps. The mold member includes a reflecting face on which a diffusion pattern reflecting the light from the lamps is formed and an upper face extending from the reflecting face so as to diffuse and reflect the light from the lamps.

The diffusion pattern includes protrusions protruded from a surface of the reflecting face. The protrusions have a circular cone shape or a hemispherical shape. The diffusion pattern has recesses formed at a surface of the reflecting face.

The reflecting face is downwardly inclined towards the lamps from the upper face. The reflecting face has openings corresponding to the lamps, respectively.

The backlight assembly may further include a lamp holder combined with ends of the lamps to hold the lamps, and the lamp holder is covered by the mold member.

The backlight assembly further includes a diffusion plate disposed on the lamps to diffuse the light generated from the lamps. The mold member has a stepped portion formed on the upper face so as to guide the diffusion plate.

The backlight assembly may further include a reflecting plate disposed under the lamps to reflect the light from the lamps, an optical sheet disposed on the diffusion plate, and a mold frame coupled to the receiving container so as to hold the diffusion plate and the optical sheet.

In another aspect of the present invention, a liquid crystal display apparatus includes a backlight assembly, a liquid crystal display panel and a top chassis.

The backlight assembly has lamps to generate light, a receiving container having a bottom portion and a side portion to receive the lamps, and a mold member having a reflecting face on which a diffusion pattern reflecting the light from the lamps is formed and an upper face extended from the reflecting face so as to diffuse and reflect the light from the lamps. The liquid crystal display panel receives the light from the backlight assembly to display an image. The top chassis fixes the liquid crystal display panel to the backlight assembly.

The invention removes a shadow portion of the backlight assembly and thereby enhances the image display quality of the liquid crystal display apparatus.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Hereinafter, the embodiments of the present invention will be described in detail with reference to the accompanied drawings.

Figure 1:
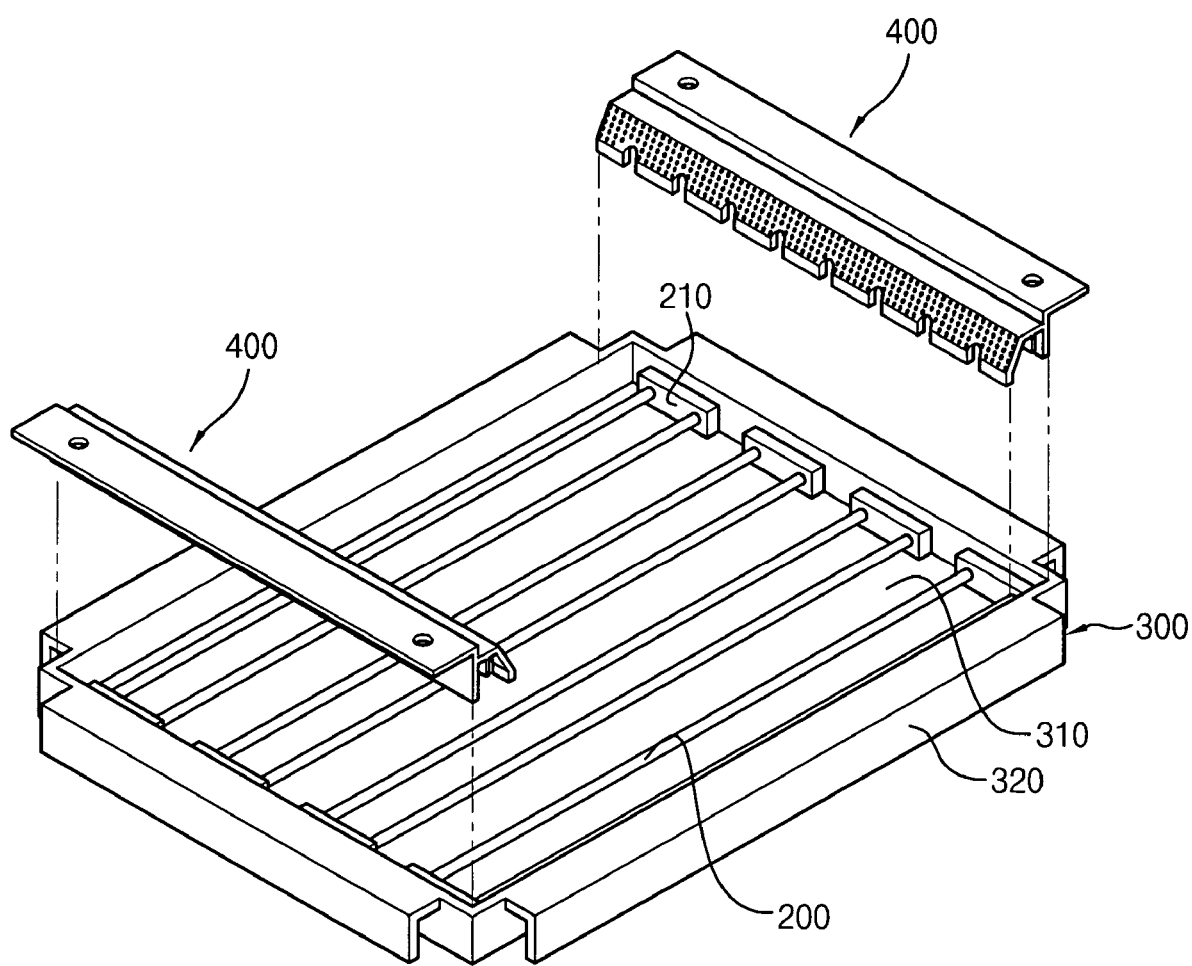
FIG. 1 is an exploded perspective view showing a backlight assembly according to an exemplary embodiment of the present invention.
Figure 2:
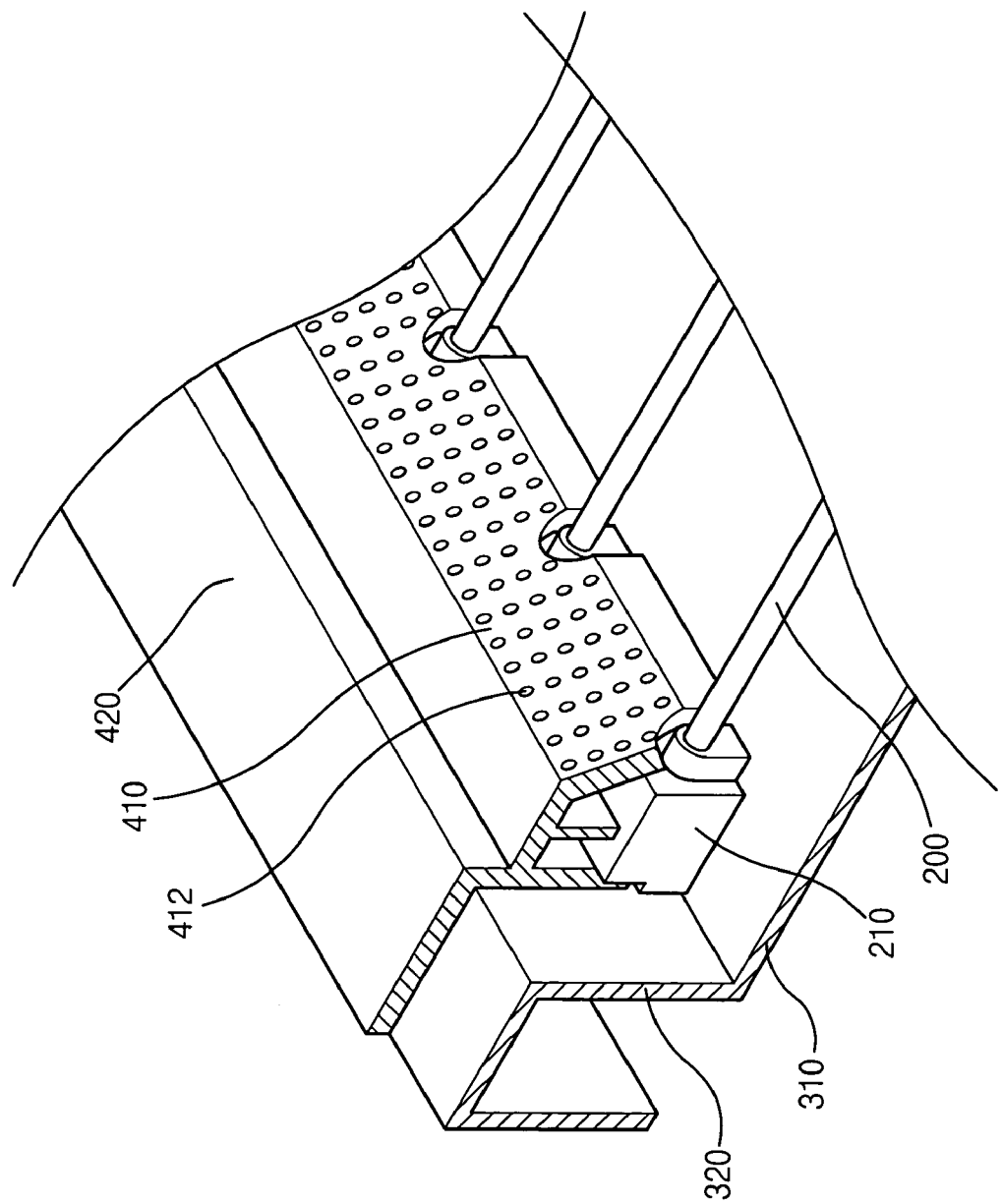
FIG. 2 is a partially enlarged perspective view of the backlight assembly of FIG. 1.

FIG. 1 is an exploded perspective view showing a backlight assembly 100 according to an exemplary embodiment of the present invention. FIG. 2 is a partially enlarged perspective view of the backlight assembly of FIG. 1.

Referring to FIGS. 1 and 2, the backlight assembly 100 includes a plurality of lamps 200, a receiving container 300, and a mold member 400. The lamps 200, such as an external electrode fluorescent lamp (EEFL), are arranged in parallel to each other and emit light. The receiving container 300 has a bottom portion 310 and a side portion 320 so as to provide a receiving space into which the lamps 200 are received. The mold member 400 is coupled to the receiving container 300 while covering the end portions of the lamps 200. The mold member 400 has a reflecting face 410 and an upper face 420 extending from the reflecting face 410 in a direction substantially parallel to the bottom portion 310. The reflecting face 410 has a diffusion pattern 412 so as to diffuse the light from the lamps 200.

The lamps 200 emit light in response to a driving voltage from an external source. Each of the lamps 200 has, for example, a cold cathode fluorescent lamp (CCFL) having a thin and elongated tubular shape. The lamps 200 are arranged in regular intervals for uniformity of brightness. The number of the lamps 200 depends on the required brightness.

In the present embodiment, the backlight assembly 100 may further include lamp holders 210 in order to fix the lamps 200 to the receiving container 300. The end portions of the lamps 200 are inserted into the lamp holders 210, and the lamp holders 210 are coupled to the receiving container 300. For example, two lamps adjacent to each other may be coupled to a single lamp holder. The lamp holders 210 are covered by the mold member 400.

The receiving container 300 is composed of the bottom portion 310 and the side portion 320 extending from and along the edge of the bottom portion 310. In order to provide a coupling space and enhance a coupling strength, the side portion 320 has an upside down U-shape. The receiving container 300 is formed of a metallic material having a good strength and rigidity. The lamps 200 coupled to the lamp holders 210 and the mold member 400 are sequentially received into the receiving space of the receiving container 300.

In the present embodiment, the backlight assembly 100 has two mold members 400 to cover both end portions of the lamps 200. The two mold members 400 are coupled to two facing side portions 320 of the receiving container 300, respectively. The two mold members have the same structure and function, and thus the description of one mold member applies to both. The mold member 400 fixes the lamp holders 210 to the receiving container 300 while covering the lamp holders 210 so they are not exposed to the environment. The mold member 400 includes the reflecting face 410 that reflects the light from the lamps 200 and the upper face 420 extending from the reflecting face 410 in the direction substantially parallel to the bottom portion 310 of the receiving container 300. In the present embodiment, the reflecting face 410 has the diffusion pattern 412 formed therein to diffuse the light such that a larger amount of light can be directed upwards.

Figure 3:
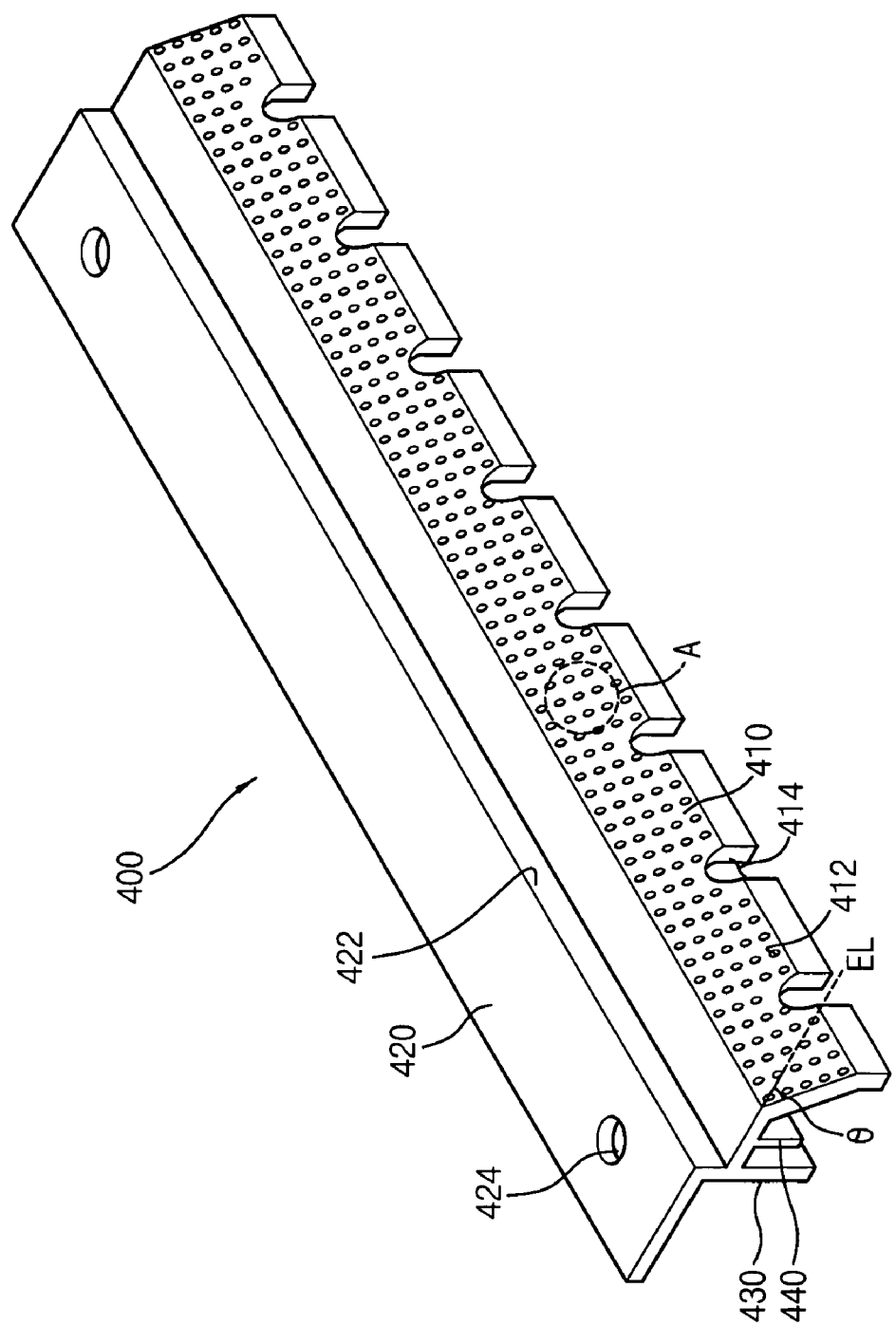
FIG. 3 is a perspective view showing in detail the mold member of FIG. 1.

FIG. 3 is a perspective view showing in detail the mold member of FIG. 1.

Referring to FIGS. 2 and 3, the mold member 400 has the reflecting face 410 that reflects the light from the lamps 200 and the upper face 420 extending from the reflecting face 410 in the direction substantially parallel to the bottom portion 310 of the receiving container 300.

The reflecting face 410 is downwardly inclined toward the lamps 200 from an extended line EL of the upper face 420 in order to reflect the light from the lamps 200 upwardly. The reflecting face 410 has an incline angle θ in the range of 45 to 90° with respect to the extended line EL. The reflecting face 410 is provided with openings 414 formed at the positions corresponding to the lamps 200, respectively. Thus, the lamps 200 are inserted into the openings 414 when the mold member 400 is coupled to the receiving container 300.

The reflecting face 410 has the diffusion pattern 412 formed therein so as to diffuse a larger amount of the light from the lamps 200 upward. The diffusion pattern 412 is formed of a fine embossment or intaglio pattern. For example, the diffusion pattern 412 may be formed simultaneously when the mold member 400 is formed by an injection molding process. In the present invention, the diffusion pattern 412 is formed in a regular arrangement. However, this is not a limitation of the invention and the diffusion pattern 412 may be irregular in some cases.

The upper face 420 extends from the reflecting face 410 in a plane that is substantially parallel to the bottom portion 310. The upper face 420 extends to the side portion 320 of the receiving container 300 while covering the lamp holders 210. The upper face 420 may have a coupling hole 424 formed therethrough, so that the upper face 420 can be coupled to the side portion 320 of the receiving container 300 with a screw passing through the coupling hole 424. Further, the upper face 420 may have a stepped portion 422 guiding and placing a diffusion plate (not shown) to be disposed above the lamps 200.

The mold member 400 may further include a first supporter 430 and a second supporter 440, which are downwardly extended from the upper face 420. When the mold member 400 is received into the receiving container 300, the first supporter 430 makes contact with the side portion 320 of the receiving container 300, thereby guiding the mold member 400 properly into a right place. The first supporter 430 is partially opened at positions corresponding to the lamp holders 210. The second supporter 440 has an extended length shorter than that of the first supporter 430, and is positioned between the first supporter 430 and the reflecting face 410. The second supporter 440 pressurizes the lamp holders 210 to thereby prevent the movement of the lamp holders 210.

Figure 4:
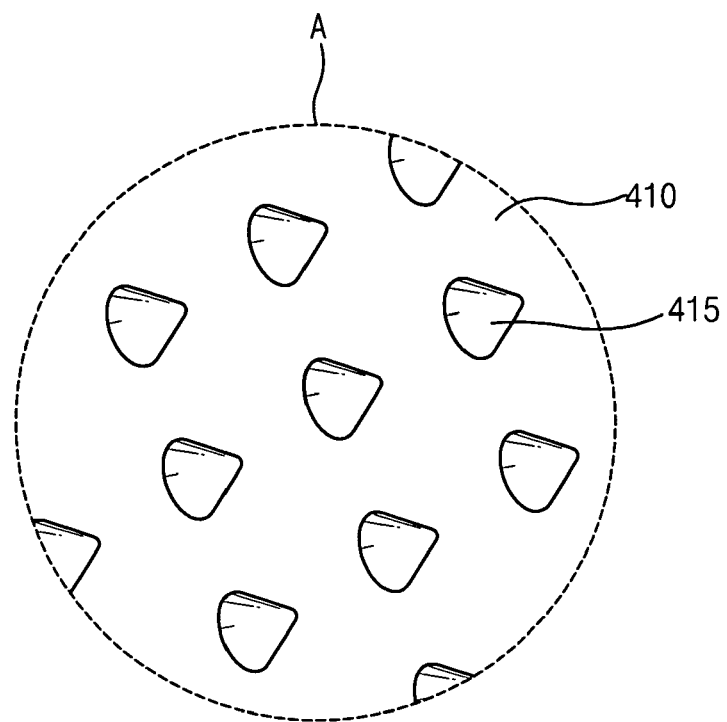
FIG. 4 is a partially enlarged view of the portion A in the diffusion pattern of FIG. 3.

FIG. 4 is a partially enlarged view of the portion A in the diffusion pattern 412 of FIG. 3 in order to illustrate an exemplary embodiment of the diffusion pattern.

Referring to FIGS. 3 and 4, the mold member 400 has the diffusion pattern 412 formed in the reflecting face 410 thereof. For example, the diffusion pattern 412 is formed of protrusions 415 protruding from the reflecting face 410. In the present embodiment, each of the protrusions 415 has a circular cone shape. In other words, each of the protrusions 415 has a circular cross section when the protrusions 415 are cut in a direction substantially parallel to the reflecting face 410, and each of the protrusions 415 has a triangular cross section when the protrusions 415 are cut in a direction substantially perpendicular to the reflecting face 410. In an alternative embodiment, the protrusions 415 may be configured to have a rectangular cross section when is the protrusions 415 are cut in the direction substantially perpendicular to the reflecting face 410. The protrusions 415 may be arranged in regular intervals with a constant spacing between them, but this is not a limitation of the invention. The protrusions 415 function to diffuse and reflect the light from the lamps 200 so as to direct a larger amount of light upward, toward the liquid crystal panel.

Figure 5:
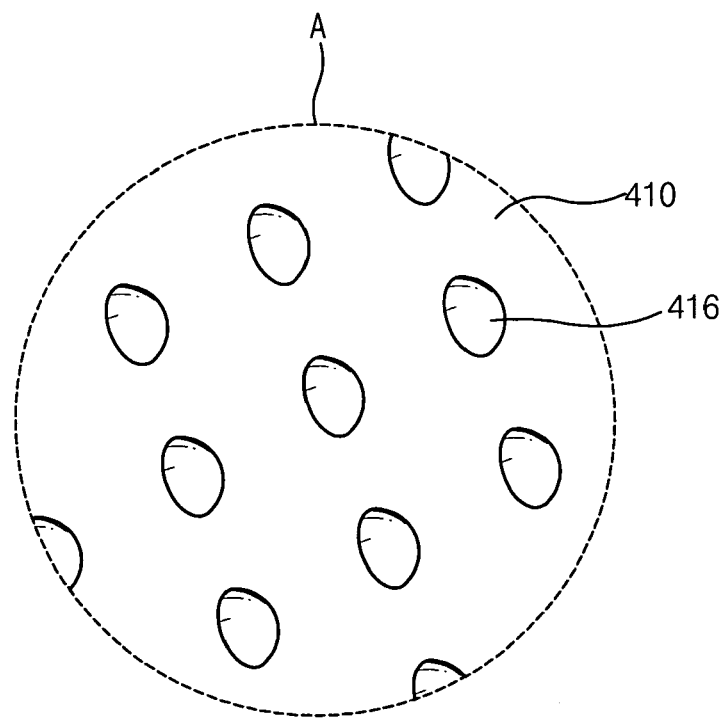
FIG. 5 is a partially enlarged view illustrating another exemplary embodiment of the diffusion pattern of FIG. 3.

FIG. 5 illustrates another exemplary embodiment of the diffusion pattern of FIG. 3.

Referring to FIGS. 3 and 5, the diffusion pattern 412 includes protrusions 416 protruding from the reflecting face 410. In the present embodiment, each of the protrusions 416 has a hemispherical shape. In other words, each of the protrusions 416 has a circular cross section when the protrusions 416 are cut in a direction substantially parallel to the reflecting face 410, and a semi-circular cross section when cut in a direction substantially perpendicular to the reflecting face 410. In the present embodiment, the protrusions 416 are arranged in regular intervals so as to have a constant spacing between them, but may be arranged irregularly. The protrusions 416 function to diffuse and reflect the light from the lamps 200 so as to direct an increased amount of light upward.

Figure 6:
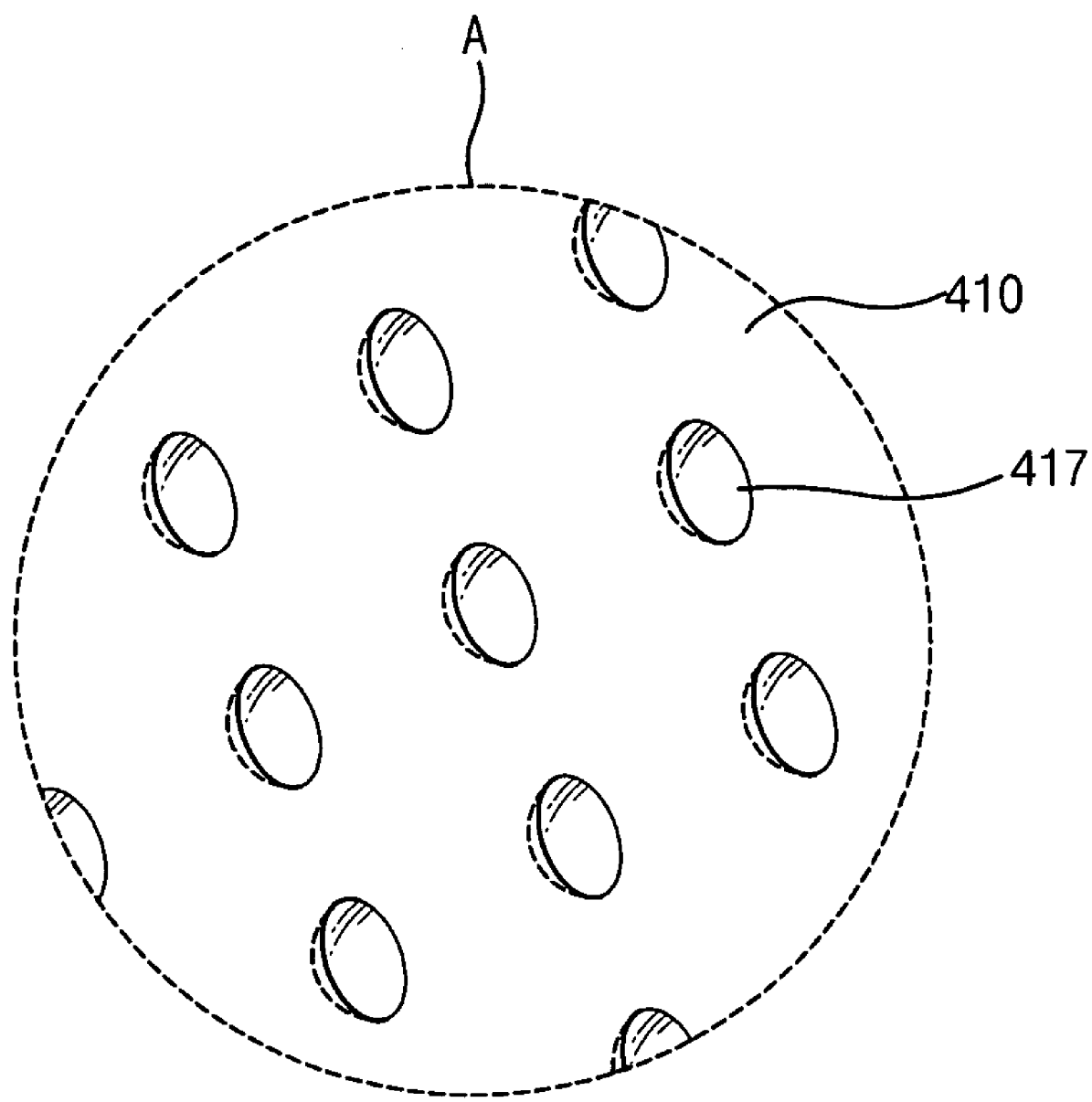
FIG. 6 is a partially enlarged view illustrating another exemplary embodiment of the diffusion pattern of FIG. 3.

FIG. 6 illustrates another exemplary embodiment of the diffusion pattern of FIG. 3.

Referring to FIGS. 3 and 6, the diffusion pattern 412 has recesses 417 formed as depressions or indentations on the reflecting face 410. The recesses 417 have predetermined depth. In the present embodiment, each of the recesses 417 may have various shapes such as a circular cone shape, a polypyramid shape, a hemispherical shape and so on. The recesses 417 may be arranged in regular intervals with a constant spacing between them, but may also be arranged irregularly. The recesses 417 function to diffuse and reflect the light from the lamps 200 so as to direct an increased amount of light upward.

Figure 7:
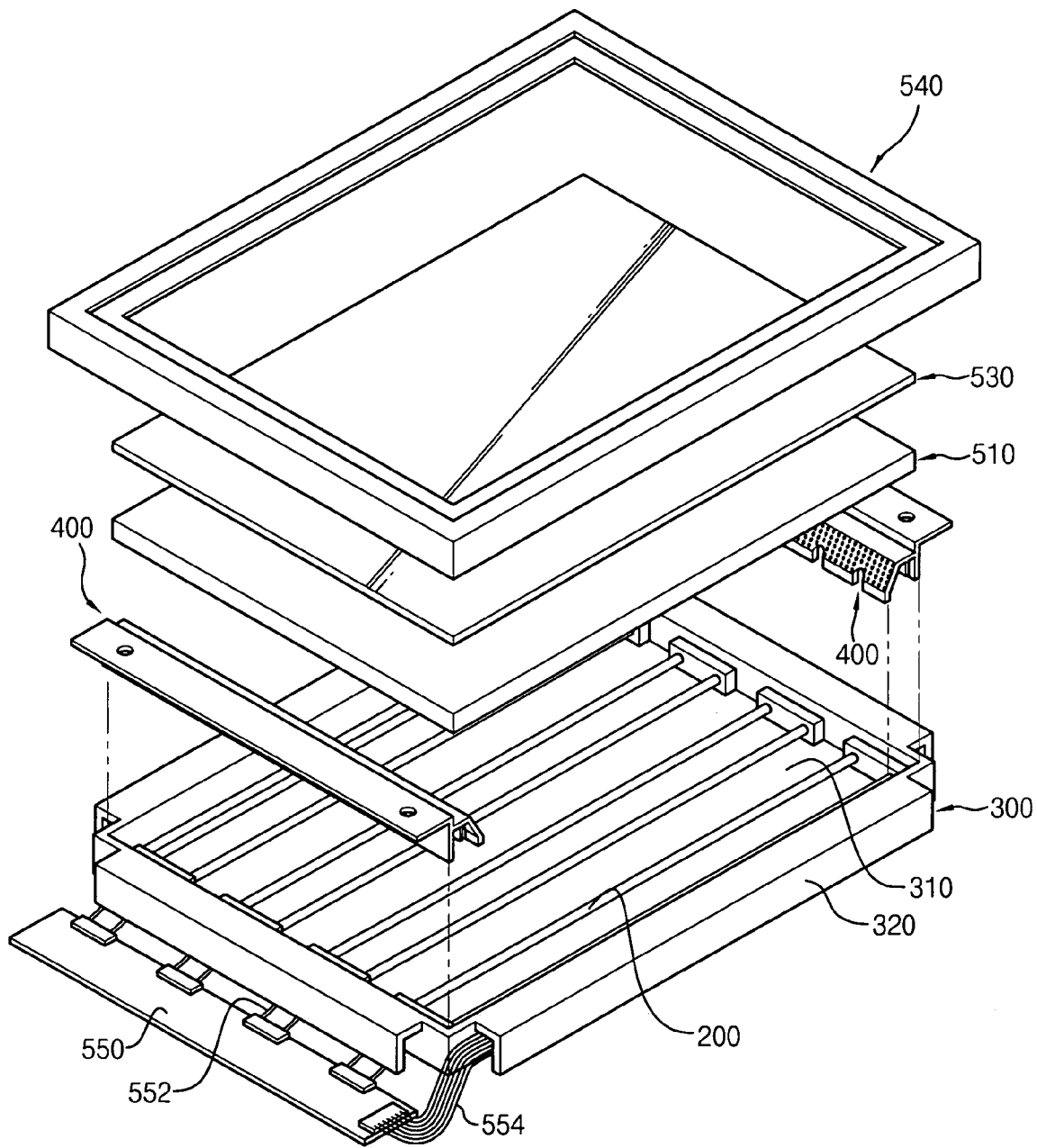
FIG. 7 is an exploded perspective view showing a backlight assembly according to another exemplary embodiment of the present invention.
Figure 8:
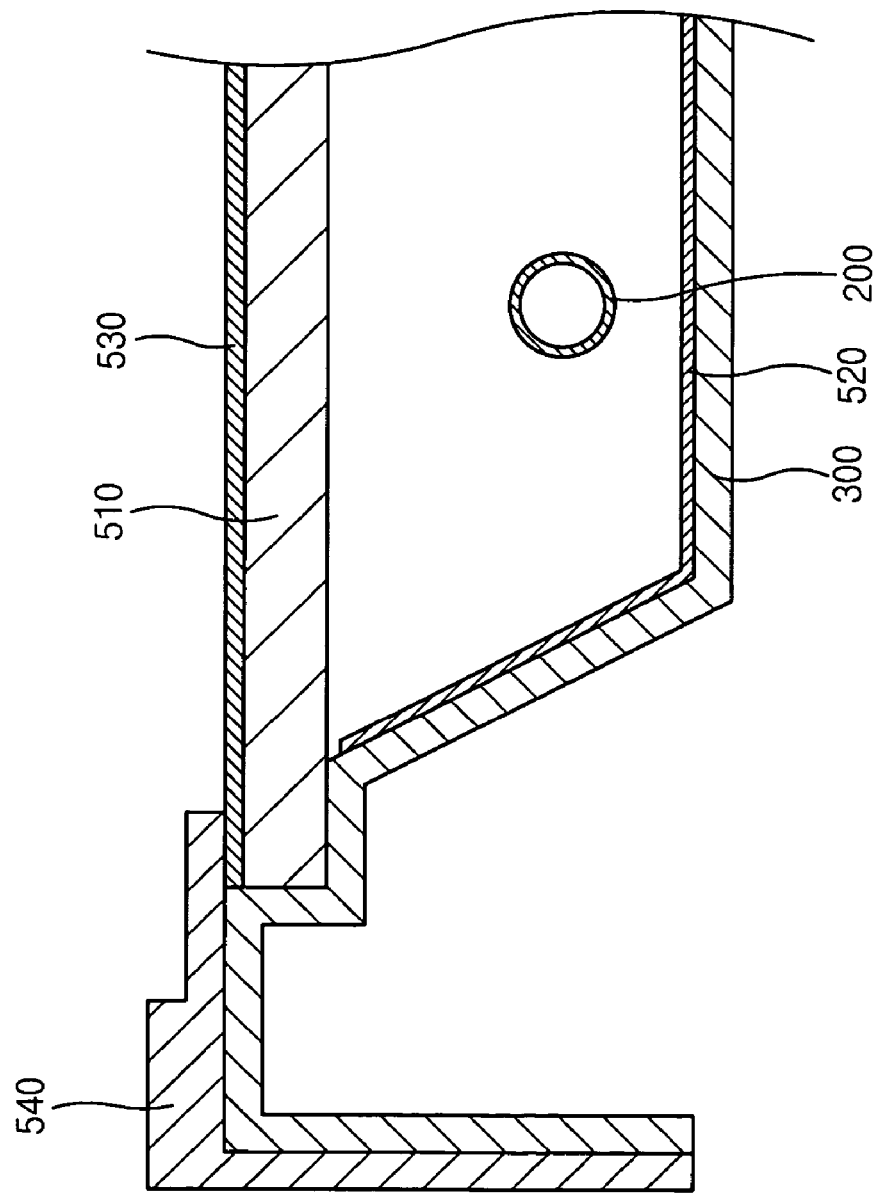
FIG. 8 is a cross-sectional view of the backlight assembly of FIG. 7.

FIG. 7 is an exploded perspective view showing a backlight assembly according to another exemplary embodiment of the present invention. FIG. 8 is a cross-sectional view showing the backlight assembly of FIG. 7. In the present embodiment, the lamps, the receiving container, and the mold member have the same structure as in FIGS. 1 to 6, and thus any further detailed descriptions thereof will be omitted.

Figure 9:
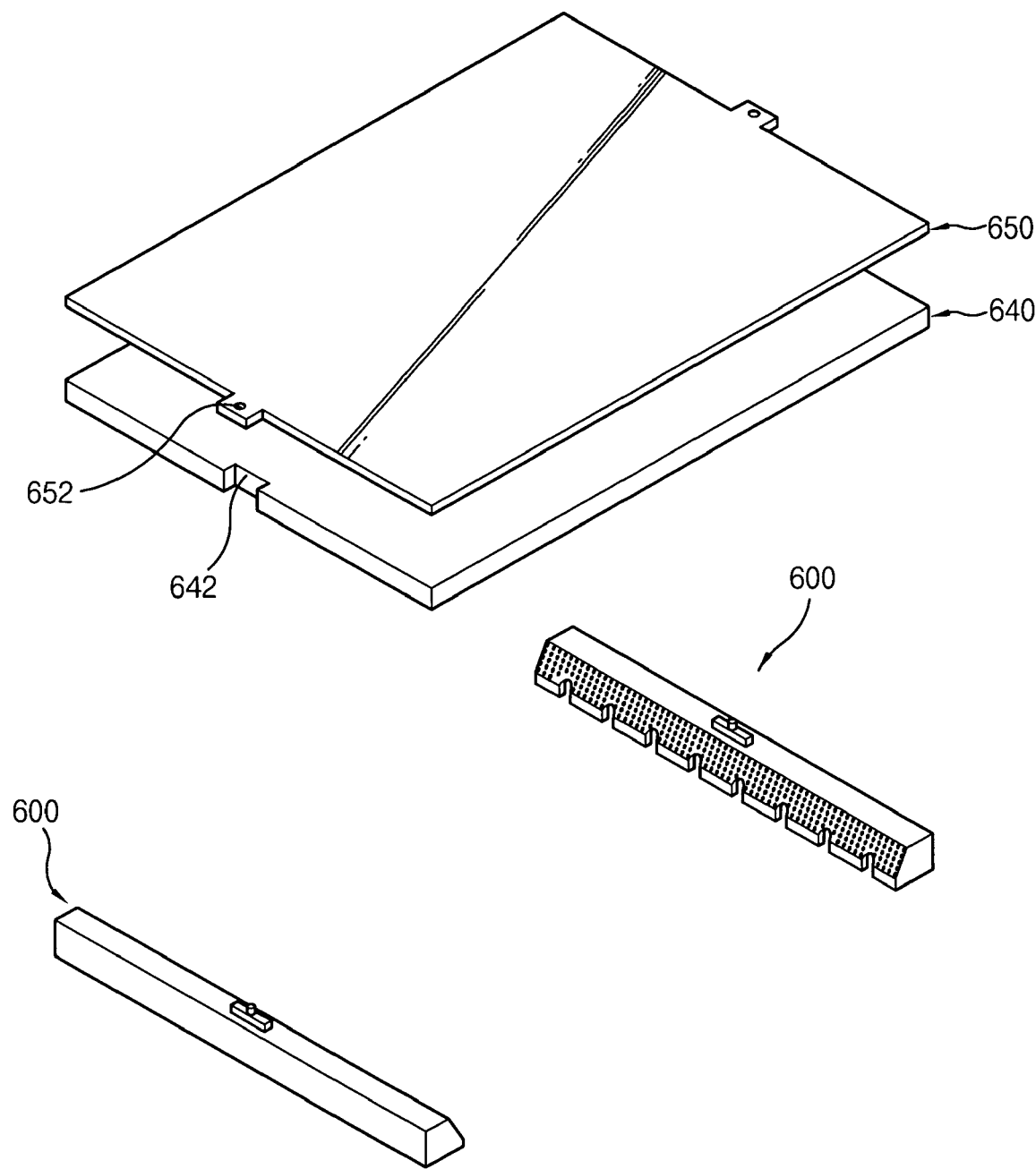
FIG. 9 is a perspective view showing another embodiment of the mold member, the diffusion plate and the optical sheet of FIG. 7.

Referring to FIGS. 7 and 9, a backlight assembly 500 of this embodiment includes a plurality of lamps 200, a receiving container 300, and a mold member 400. The lamps 200 are arranged in parallel to each other and emit light. The receiving container 300 has a bottom portion 310 and a side portion 320 to provide a receiving space into which the lamps 200 are received. The mold member 400 is coupled to the receiving container 300 while covering the end portions of the lamps 200. The mold member 400 has a reflecting face 410 and an upper face 420 extending from the reflecting face 410 in a direction substantially parallel to the bottom portion 310 of the receiving container 300. The reflecting face 410 is provided with a diffusion pattern 412 formed therein in order to diffuse the light from the lamps 200.

The backlight assembly 500 further includes a diffusion plate 510 disposed above the lamps 200 to diffuse the light generated from the lamps 200. The diffusion plate 510 has a rectangular plate-like shape having a predetermined thickness. The diffusion plate 510 diffuses the light generated from the lamps 200 to thereby enhance the uniformity of brightness of the light. The diffusion plate 510 is disposed spaced apart from the lamps 200 by a predetermined distance, and supported by the upper face 420 (see FIG. 3) of the mold member 400 and the side portion 320 of the receiving container 300.

The backlight assembly 500 further includes a reflecting plate 520 disposed under the lamps 200 to reflect the light from the lamps 200. The reflecting plate 520 is formed in regions, which correspond to the bottom portion 310 and two side portions 320 substantially parallel to the lamp 200. The reflecting plate 520 functions to reflect the light directed from the lamps 200 upward, thereby enhancing light efficiency.

The backlight assembly 500 may further include at least one optical sheet 530 disposed on the diffusion plate 510. The optical sheet 530 functions to convert a path of the light from the diffusion plate 510 such that the brightness and the uniformity thereof can be enhanced. Thus, the optical sheet 530 includes a condensing sheet that condenses the light from the diffusion plate 510 or a diffusion sheet that diffuses again the light diffused through the diffusion plate 510. The number of the optical sheet 530 may vary, depending on a desired brightness characteristic of the backlight assembly 500.

The backlight assembly 500 may further include a mold frame 540. The mold frame 540 is coupled to the receiving container 300 to fix the diffusion plate 510 and the optical sheet 530 to the receiving container 300. That is, the mold frame 540 fixes the ends of the diffusion plate 510 and the optical sheet 530 when coupled to the receiving container 300. The mold frame 540 may be formed in two or four pieces, in case where a size thereof is so large that it cannot be easily fabricated in the form of a single piece.

The backlight assembly 500 may further include an inverter 550 disposed at a rear face of the receiving container 300. The inverter 550 generates a driving voltage for driving the lamps 200. The inverter 550 functions to transform a low-voltage alternating current into a high-voltage alternating current, which is output to the lamps 200 as the driving voltage. The driving voltage from the inverter 550 is applied to each of the lamps 200 through first and second lamp wires 552 and 554. That is, one end of each lamp 200 is electrically connected to the inverter 550 through the first lamp wire 552 and the other end is electrically connected to the inverter 550 through the second lamp wire 554.

Figure 10:
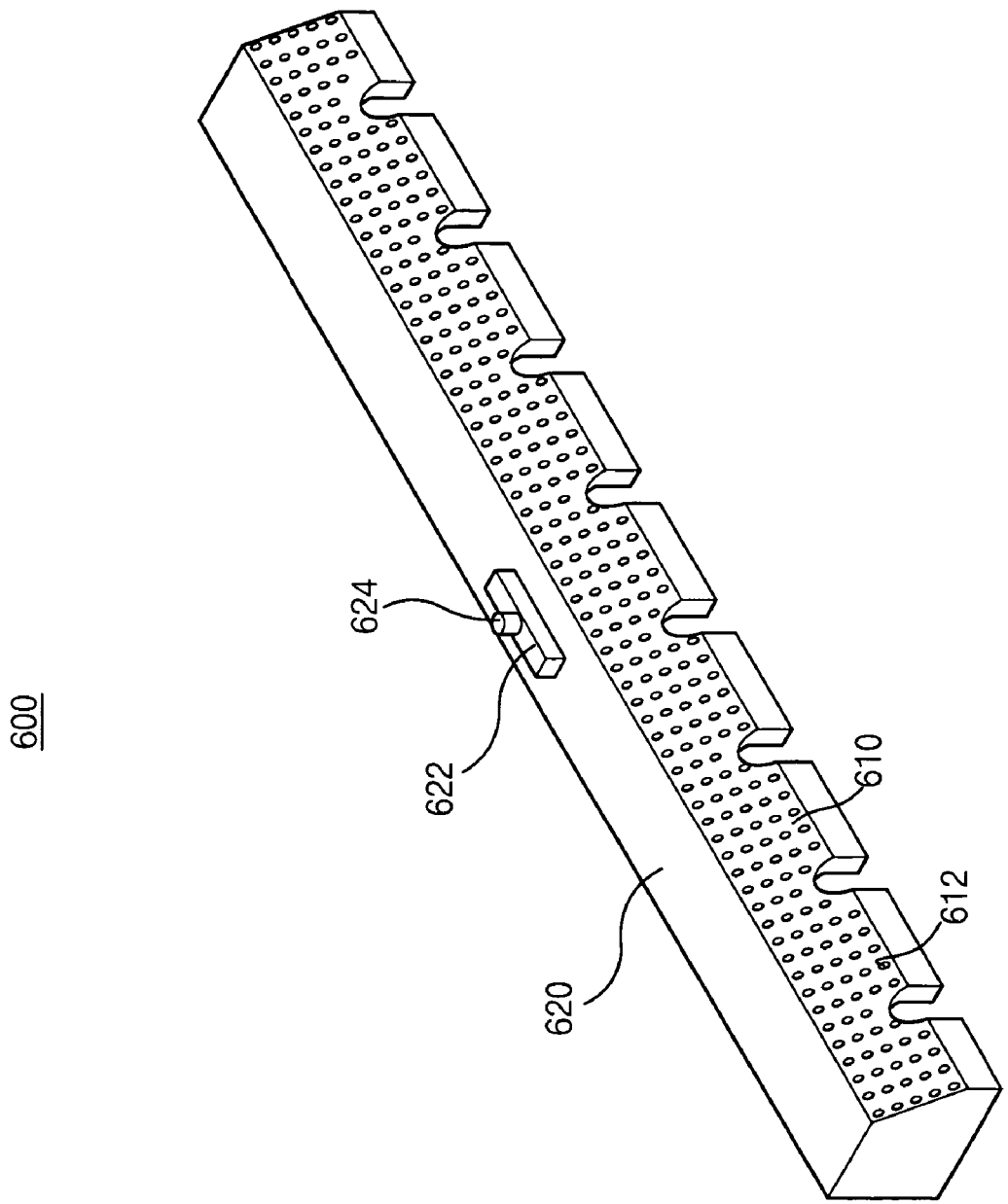
FIG. 10 is a perspective view showing in detail the mold member of FIG. 9.

FIG. 9 is a perspective view showing another embodiment of the mold member, diffusion plate and optical sheet of FIG. 7. FIG. 10 is an enlarged perspective view of the mold member in FIG. 9.

Referring to FIGS. 9 and 10, a mold member 600 includes a reflecting face 610 and an upper face 620. A diffusion pattern 612 is formed on the reflecting face 610 so as to direct the light upward toward the liquid crystal panel. In FIGS. 9 and 10, the diffusion pattern 612 has the same structure and function as those of the diffusion pattern of FIGS. 4 to 6, and thus any further detailed description thereof will not be repeated. The mold member 600 has a fixing portion 622 protruding from the upper face 620, wherein the fixing portion 622 is designed for fixing the diffusion plate 640. The diffusion plate 640 is provided with a fixing recess 642 formed therein so as to be coupled to the fixing portion 622. When the fixing portion 622 is coupled to the fixing recess 642, the diffusion plate 640 is fixed to the upper face 620 of the mold member 600.

The mold member 600 includes a sheet-fixing portion 624 formed on the fixing portion 622 so as to fix the optical sheet 650. The sheet-fixing portion 624 has the form of a protrusion on the fixing portion 622. Although the sheet-fixing portion 624 may be formed on the upper face 620, it is preferably formed on the fixing portion 622. The optical sheet 650 has a fixing hole 652 into which the sheet-fixing portion 624 is to be inserted. When the sheet-fixing portion 624 is inserted into the fixing hole 652, the optical sheet 650 is fixed to the mold member 600.

Figure 11:
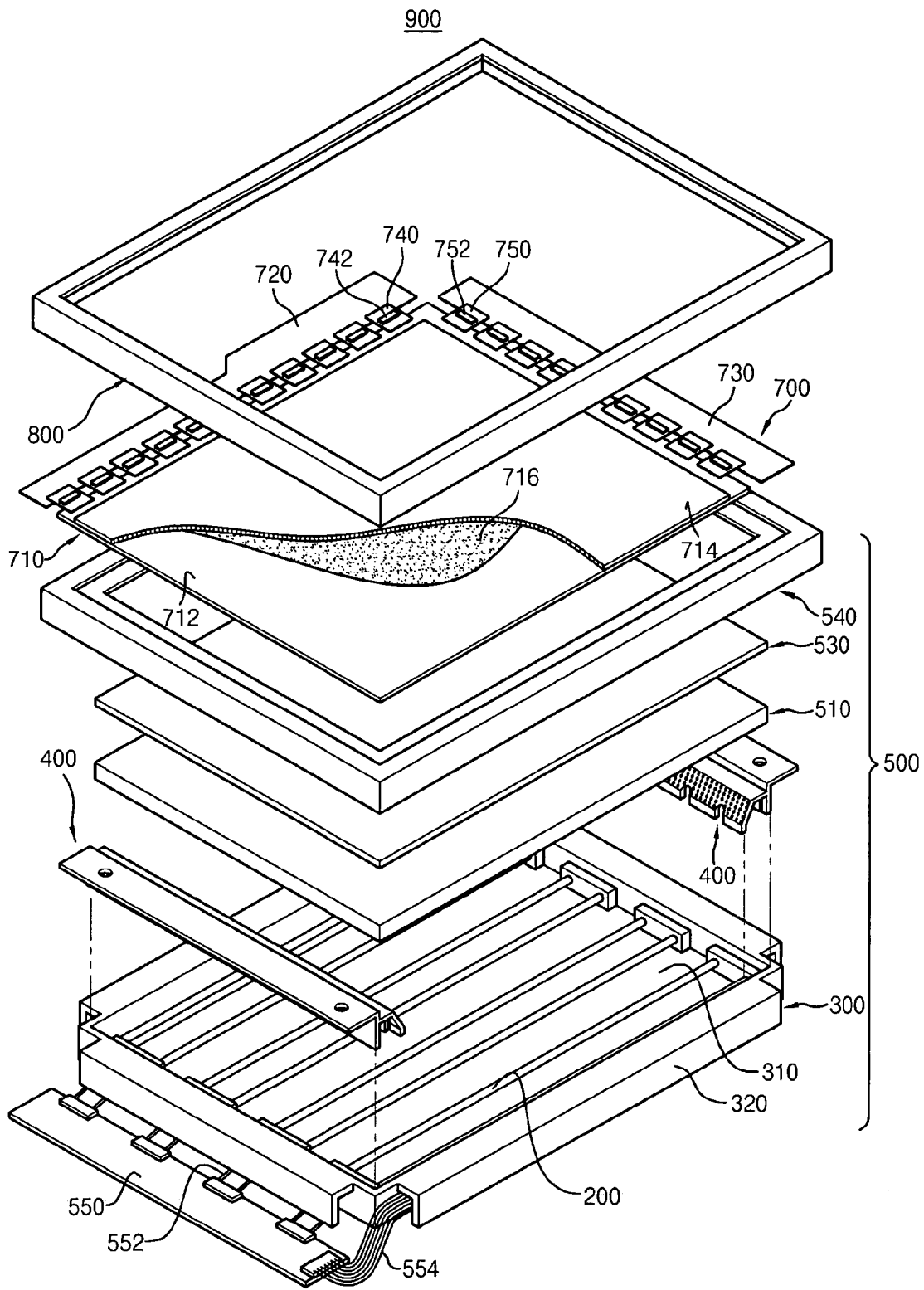
FIG. 11 is an exploded perspective view showing a liquid crystal display apparatus according to an exemplary embodiment of the present invention.

FIG. 11 is an exploded perspective view showing a liquid crystal display apparatus according to an exemplary embodiment of the present invention. In FIG. 11, the liquid crystal display apparatus is denoted generally at 900. In the present embodiment, the backlight assembly is the same as in FIGS. 1 to 10, and thus details thereof will not be repeated here.

Referring to FIG. 11, the liquid crystal display apparatus 900 of this embodiment includes a backlight assembly 500 supplying the light, a display unit 700 displaying an image and a top chassis 800 fixing the display unit 700.

The display unit 700 includes a liquid crystal display panel 710 displaying an image, and data and gate printed circuit boards 720 and 730 providing driving signals for the liquid crystal display panel 710. The driving signals from the data and gate printed circuit boards 720 and 730 are applied to the liquid crystal display panel 710 through data and gate flexible printed circuit films 740 and 750, respectively. For example, each of the data and gate flexible printed circuit films 740 and 750 may be formed of a tape carrier package (TCP) or a chip on film (COF). The data flexible printed circuit film 740 further includes a data driving chip 742 and a gate driving chip 752 so as to control the driving signal such that the driving signals from the date and gate printed circuit boards can be timely applied to the liquid crystal display panel 710. The data printed circuit board 720 is disposed at the rear face of the receiving container 300 by bending the data flexible printed circuit film 740. The gate printed circuit board 730 is disposed at the rear face or a side face of the receiving container 300 by bending the gate flexible printed circuit film 750. On the other hand, the gate printed circuit board 730 and the date printed circuit board 720 may be integrated into a single printed circuit board.

The liquid crystal display panel 710 includes a thin film transistor (TFT) substrate 712, a color filter substrate 714 facing the TFT substrate 712, and liquid crystal 716 interposed between the TFT substrate 712 and the color filter substrate 714.

The TFT substrate 712 is a transparent glass substrate with TFTs (switching elements) formed therein in a matrix configuration. Each of the TFTs has a source terminal connected to a data line, a gate terminal connected to a gate line, and a drain terminal connected to a pixel electrode (not shown), which is made of a transparent conductive material.

The color filter substrate 714 is a substrate on which RGB color pixels (not shown) are formed by a thin film process. The color filter substrate 714 has a common electrode (not shown) formed thereon. The common electrode is formed of a transparent conductive material.

When a power voltage is applied to the gate terminals of the TFTs and the TFTs are turned on, an electric field is generated between the pixel electrode and the common electrode. The arrangement of the liquid crystal 716 between the TFT substrate 712 and the color filter substrate 714 is varied due to the electric field applied thereto, and thus a light transmittance of the liquid crystal 716 varies with the arrangement thereof, thereby enabling to display the image of a desired gradation.

The top chassis 800 is coupled to the receiving container 300, while wrapping around an edge area of the liquid crystal display panel 710 so as to fix the liquid crystal display panel 710 to the backlight assembly 500. Thus, the top chassis 710 prevents damage to the liquid crystal display panel 710 from an external impact and separation of the liquid crystal display panel 710 from the backlight assembly 500.

According to the backlight assembly and the liquid crystal display apparatus of the invention, the mold member covering the ends of the lamps is provided with the diffusion pattern formed in the reflecting face thereof to diffuse and reflect the light. The presence of the diffusion pattern eliminates a shadow portion in the peripheral area of the backlight assembly and thereby enhances the image display quality of the liquid crystal display apparatus.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
a plurality of lamps to generate light;
a receiving container to receive the lamps, the receiving container having a bottom portion and a side portion; and
a mold member coupled to the side portion of the receiving container while covering ends of the lamps, the mold member fixing the lamps to the side portion of the receiving container, the mold member having a reflecting face and an upper face extending from the reflecting face, the reflecting face having a diffusion pattern formed thereon so as to diffuse and reflect light from the lamps.

2. The backlight assembly of claim 1, wherein the diffusion pattern comprises protrusions on a surface of the reflecting face.

3. The backlight assembly of claim 2, wherein each of the protrusions has a circular cone shape.

4. The backlight assembly of claim 2, wherein each of the protrusions has a hemispherical shape.

5. The backlight assembly of claim 1, wherein the diffusion pattern comprises recesses on a surface of the reflecting face.

6. The backlight assembly of claim 1, wherein the reflecting face is downwardly inclined toward the lamps from the upper face.

7. The backlight assembly of claim 6, wherein the reflecting face comprises openings formed at positions corresponding to the lamps, respectively.

8. The backlight assembly of claim 1, further comprising a lamp holder combined with ends of the lamps so as to hold the lamps, the lamp holder being covered by the mold member.

9. The backlight assembly of claim 1, further comprising a diffusion plate disposed on the lamps to diffuse the light generated from the lamps.

10. The backlight assembly of claim 9, wherein the mold member comprises a stepped portion formed on the upper face thereof to guide the diffusion plate.

11. The backlight assembly of claim 9, wherein the mold member comprises a fixing portion formed on the upper face thereof to fix the diffusion plate, the fixing portion protruding from the upper face.

12. The backlight assembly of claim 11, wherein the diffusion plate comprises a fixing recess to be coupled to the fixing portion of the mold member.

13. The backlight assembly of claim 9, further comprising:
a reflecting plate disposed under the lamps to reflect the light from the lamps; and an optical sheet disposed on the diffusion plate.

14. The backlight assembly of claim 13, wherein the mold member comprises a sheet-fixing portion formed on the upper face thereof to fix the optical sheet.

15. The backlight assembly of claim 14, wherein the sheet-fixing portion protrudes from the upper face.

16. The backlight assembly of claim 13, wherein the optical sheet comprises a condensing sheet to condense the light diffused by the diffusion sheet.

17. The backlight assembly of claim 13, wherein the optical sheet comprises a diffusion sheet to diffuse the light diffused by the diffusion sheet.

18. The backlight assembly of claim 13, further comprising:
- a mold frame coupled to the receiving container to hold the diffusion plate and the optical sheet; and
- an inverter disposed on a rear face of the receiving container to generate a driving voltage for the lamps.

19. The backlight assembly of claim 1, wherein the upper fact of the mold member extending substantially parallel to the bottom portion of the receiving container so as to cover the side portion of the receiving container upon assembly.

20. A liquid crystal display apparatus comprising:
- a backlight assembly comprising:
  - a plurality of lamps to generate a light;
  - a receiving container to receive the lamps, the receiving container having a bottom portion and a side portion; and
  - a mold member coupled to the side portion of the receiving container while covering ends of the lamps, the mold member fixing the lamps to the side portion of the receiving container, the mold member having a reflecting face and an upper face extending from the reflecting face, the reflecting face having a diffusion pattern formed thereon so as to diffuse and reflect the light from the lamps,
- a liquid crystal display panel to display an image using the light supplied from the backlight assembly; and
- a top chassis to fix the liquid crystal display panel to the backlight assembly.

21. The liquid crystal display apparatus of claim 20, wherein the diffusion pattern comprises protrusions on a surface of the reflecting face.

22. The liquid crystal display apparatus of claim 20, wherein the diffusion pattern comprises recesses on a surface of the reflecting face.

23. The liquid crystal display apparatus of claim 20, wherein the reflecting face is downwardly inclined toward the lamps from the upper face.

24. The liquid crystal display apparatus of claim 23, wherein the reflecting face comprises openings formed at positions corresponding to the lamps, respectively.

25. The liquid crystal display apparatus of claim 20, wherein the backlight assembly further comprises: a reflecting plate disposed under the lamps to reflect the light from the lamps; a diffusion plate disposed on the lamps to diffuse the light from the lamps; and an optical sheet disposed on the diffusion plate.

26. The liquid crystal display apparatus of claim 25, wherein the backlight assembly further comprises: a mold frame coupled to the receiving container so as to hold the diffusion plate and the optical sheet; and an inverter disposed on a rear face to generate a driving voltage for the lamps.

27. The liquid crystal display apparatus of claim 20, wherein the backlight assembly further comprises a lamp holder combined with ends of the lamps so as to hold the lamps, the lamp holder being covered by the mold member.

28. The liquid crystal display apparatus of claim 20, wherein the upper face of the mold member extending substantially parallel to the bottom portion of the receiving container so as to cover the side portion of the receiving container upon assembly.

* * * * *